United States Patent [19]

Nishikado et al.

[11] Patent Number: 4,987,531
[45] Date of Patent: Jan. 22, 1991

[54] FILE SYSTEM MANAGEMENT METHOD AND FILE MANAGEMENT SYSTEM

[75] Inventors: Takashi Nishikado, Ebina; Megumu Kondo, Kawasaki; Fumiya Murata, Hadano, all of Japan

[73] Assignee: Hitachi, Ltd., Tokyo, Japan

[21] Appl. No.: 195,289

[22] Filed: May 18, 1988

[30] Foreign Application Priority Data

May 20, 1987 [JP] Japan .................. 62-121245

[51] Int. Cl.⁵ .............................. G06F 9/00
[52] U.S. Cl. .................. 364/200; 364/280.1; 364/283.1
[58] Field of Search ... 364/200 MS File, 900 MS File, 364/300

[56] References Cited

U.S. PATENT DOCUMENTS

| | | | |
|---|---|---|---|
| 3,388,381 | 6/1968 | Prywes et al. | 364/200 |
| 4,468,728 | 8/1984 | Wang | 364/200 |
| 4,611,298 | 9/1986 | Schuldt | 364/900 |
| 4,672,532 | 6/1987 | dongeVos | 364/200 |

OTHER PUBLICATIONS

Communications of ACM, vol. 17, No. 7 (Jul. 1974), pp. 365–375.

Primary Examiner—Michael R. Fleming
Assistant Examiner—Debra A. Chun
Attorney, Agent, or Firm—Antonelli, Terry, Stout & Kraus

[57] ABSTRACT

In order to be able to arrange a series of files, which are in a reference relationship, on an arbitrary path, depending on the structure of the file system, a path specifying a particular file, which is in the reference relationship, is specified by a position relative to an object program file in a file system including a program, which is in course of execution, depending on the program, which is in course of execution.

4 Claims, 4 Drawing Sheets

2a: OBJECT PROGRAM FILE

EXECUTE ("/LIB/TRANS"); ------- TRANSLATION SOURCE TO ASSEMBLY LANGUAGE

EXECUTE ("/OBJ/ASM");
EXECUTE ("/OBJ/LINK");

FILE SYSTEM MANAGEMENT METHOD AND FILE MANAGEMENT SYSTEM

BACKGROUND OF THE INVENTION

1. Field of the Invention

This invention relates to a file management system and a management method therefor, and more particularly to a method for specifying a file of a file system which stores files constituted in a tree structure. The file management system and management method of the present invention are suitable for the case where a plurality of work stations share object programs or the case where an object program in a certain work station is distributed to other work stations.

2. Description of the Prior Art

A file system management method for managing files in a tree structure is discussed e.g. in Communications of ACM, Vol. 17, No. 7 (July 1974), pp 365-375.

FIGS. 5A and 5B indicate the conception of an example of the prior art tree structure file system management method. In FIG. 5A a file system 1 has a tree structure, in which "/" represents the root of the tree; obj, lib and src are branches of the tree; and comp, asm, link, trans, f1 and f2 are leaves of the tree. "/", obj, lib and src, which are not leaves, are called directories, and the absolute path from "1", which is the root of the tree, to one of the files, which are the leaves of the tree, is defined unequivocally by specifying successively a directory for every rank. For example the file comp within the file system 1 can be represented by /obj/comp, "/" being the symbol indicating a delimiter between two adjacent ranks.

Consider now a case where the file f1 is compiled, the file comp being the compiler. The user executes an object program, which is the content of the file comp, and starts the compiler, using the file f1 as an argument. The file comp executes the file trans and translates the source to the assembly language, transfers the result thus obtained to the files asm and link, and effects the assembly and the link. In this case the object program stored in the file comp uses an absolute path name on the tree structure such as execute ("/lib/trans"), execute ("/obj/asm"), execute ("/obj/link"), etc., as indicated by 2a in FIG. 5B, in order to specify the files "trans", "asm" and "link" in the file system 1. Consequently, in the case where data in a certain file is referred to or a program is started from a program in another file, they should be specified by using an absolute path name from the root in the tree structure, in which there exists the file, which is to be referred to or started however, this gives rise to a problem that the specified file should be located on a fixed path within the file system, i.e. under a specified directory.

SUMMARY OF THE INVENTION

The main object of this invention is to provide a file system management method and a file management system, in which it is possible to locate a series of files, which are mutually in a reference relationship, on an arbitrary path, in the case where a plurality of files including the series of files, which are mutually in a reference relationship, are arranged in a tree structure in the file system.

In order to achieve the above object this invention is characterized in that in an information processing device, in which a file system storing a plurality of files in a tree structure is constructed in a memory device and data of the files described above are referred to or an object program in the files is executed by the central processing unit, for specifying a file to be referred to or to be executed from another file including the object program described above. The path of the file to be referred to or to be executed is specified by a relative relationship from the directory, in which there exists the object program stated above, (hereinbelow called object file relative), and when the object program is executed by the central processing unit, corresponding to the object program, which is in course of execution at that time, information concerning under which a sub-tree of the object file is loaded and executed on the tree structure of the file system described above is held and the file is specified by the relative position to that on the tree structure with in the file system including the object program file described above corresponding to the object program from the object program, which is in course of execution.

According to this invention, since the path of the file can be specified in the object program file in a relative way, if only the relative positional relationship to the object program file on the file system is known, it is possible to access and execute the file from a program, independently of the absolute position on the tree structure of the file system. Consequently a series of files referred to and executed from the program is not necessarily located at a fixed position on the file system, but only if the object file relative is observed, no problem is produced by the fact that it is located in an arbitrary position on the file system.

The above-mentioned and other features and objects of this invention will become more apparent by reference to the following description taken in conjunction with the accompanying drawings.

DESCRIPTION OF THE PREFERRED EMBODIMENTS

Figure 1:
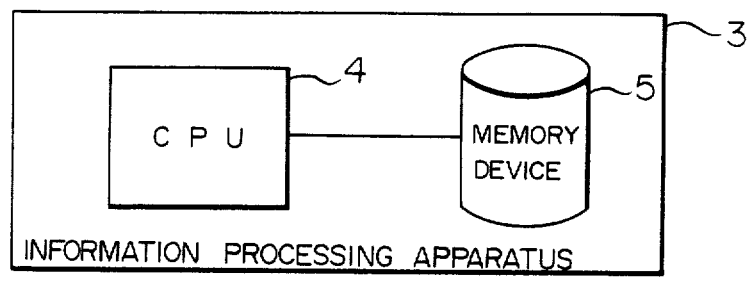
FIG. 1 is a block diagram illustrating an example of the structure of the information processing device realizing this invention.

FIG. 1 is a scheme illustrating the construction of an information processing system 3, in which a file management system according to this invention is realized.

Figure 2A:
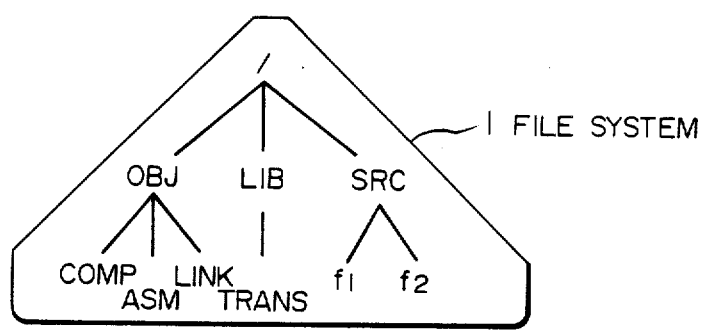
FIG. 2A is a conceptional scheme of a file system constructed in the memory device in FIG. 1.

In the figure a file system 1, whose structure is indicated by the conceptional scheme in FIG. 2A, is stored in a memory device 5. The central processing unit 4 reads out and executes the program files stored as a file of the file system 1 stated above, or refers to data stored as a file on the basis of the file management program provided in the central processing unit.

Figure 2B:
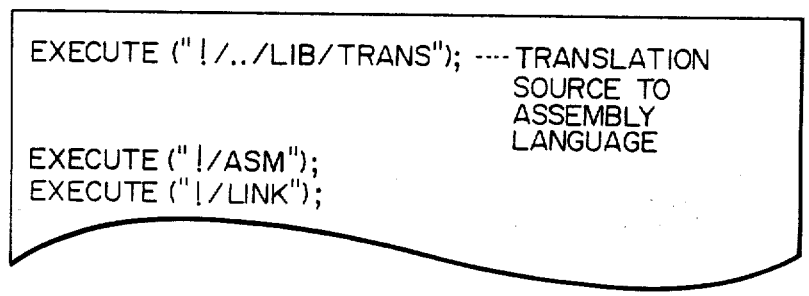
FIG. 2B shows the content of an object program in the file comp in FIG. 2A according to this invention.
Figures 5A, 5B:
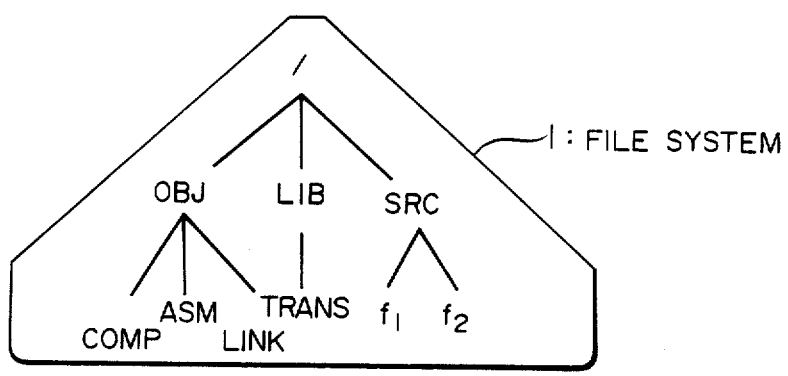
FIG. 5A is a conceptional scheme illustrating the construction of a file in a prior art file management system.
FIG. 5B shows the content of an object program in a file "comp" in FIG. 5A.

The structure of the file system indicated in FIG. 2A is supposed to be identical to that indicated in FIG. 5A for sake of simplicity of the explanation. What differs from the prior art example is that, in the object program of the file "comp" in FIG. 2A, as indicated in FIG. 2B, in order to execute programs "trans", "asm" and "link", instead of specifying the absolute path on the tree structure of the file system, "!/../lib/trans", "!/asm" and "!/link" are specified. Here "!" represents an object file relative relationship and since an object program by "comp" is under a directory, which is "/obj", it has an effect, which is equal to the substitution of "!" by "/obj". Further " .." in "!/../lib/trans" is a representation used in the article described above, which is a prior art example, and indicates a directory in the rank, which is higher by 1, (parent directory) on the path in the file system. That is, "!/.. " is equal to "1", which is the parent directory and consequently "!/../lib/trans" specifies "/lib/trans". In the prior art example, since the object program in the file "comp" is expressed by using an absolute path name, e.g. if "/obj" is changed to "/obj 2" which is another file system, the program in the file "comp" should be also changed. On the contrary, according to this embodiment, when "/obj" is changed to "/obj 2", since "!" in the program has a meaning equivalent to "/obj 2", the file "comp" itself need not be changed.

Now the work of an embodiment of the file management system included in information processing apparatus 3 of FIG. 1 will be explained below, referring to FIG. 3.

Figure 3:
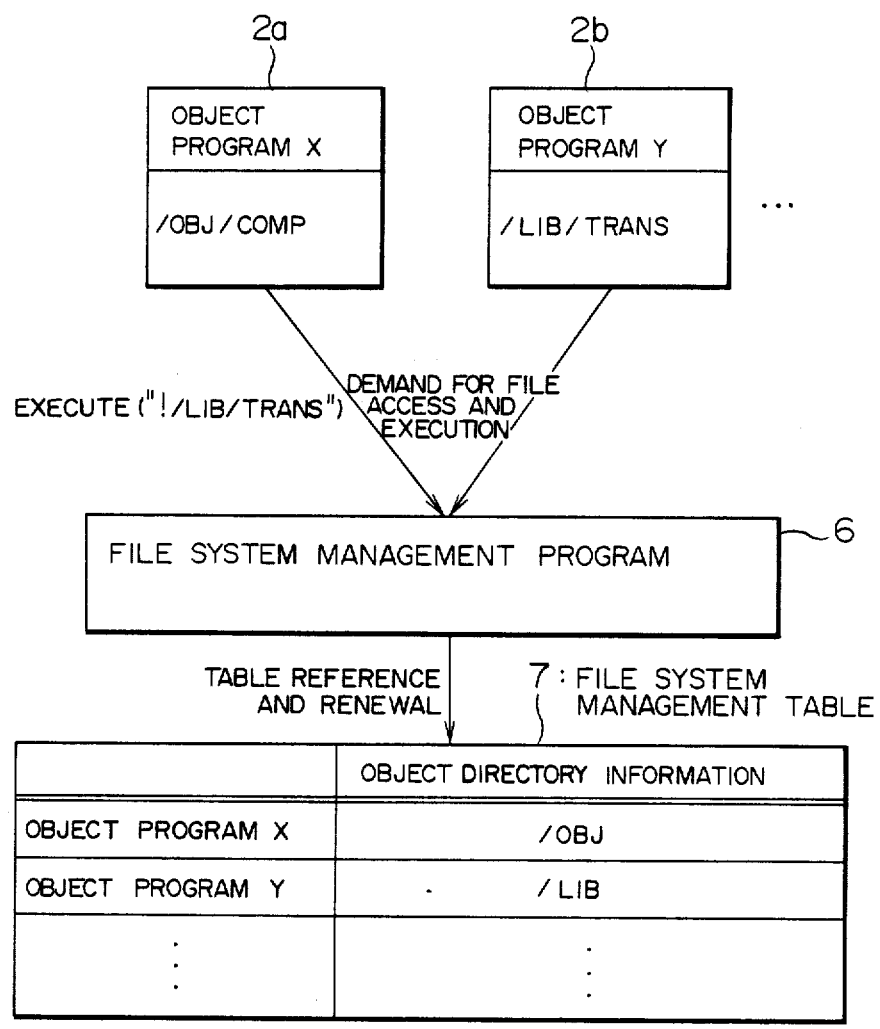
FIG. 3 is a block diagram for explaining the work of an embodiment of the file management system according to this invention.

FIG. 3 shows how a demand to access and execute a file from object programs 2a and 2b of a user is processed under the control by the file system management program 6 in the central processing unit 4 in FIG. 4. In FIG. 3 reference 7 is a file system management table, which is provided with a column, where, corresponding to each of the object programs, which is in course of execution at that time, information indicating under which directory the object program, having been loaded and executed, a file (object directory information) is stored. Each entry of the file system management table 7 is formed and set at the beginning of the execution of each object program by the file system management program 6, and deleted at the termination. This object directory information set at the beginning of the execution of the object program is "/obj" and "/lib" and used for transforming a file path specification of object file relative into an absolute path on the file system. That is, in the case where the demand to access and execute the file from each of the object programs is object-file-relative, the file system management program 6 transforms it into an absolute path by using the corresponding object directory information in the file system management table 7 and realizes the access and the execution.

The file management system described above will be explained more in detail, taking the case when the object program 2a (/obj/comp) in FIG. 3 executes the object program 2b (/lib/trans). In the state where only the object program 2a (/obj/comp) is executed, as the entry of the file system management table 7, only "/obj" is stored, which is an entry of an object program X. Consider now a case where the object program 2a demands to execute ("!/../lib/trans"), as indicated in FIG. 2B, to the file management program 6. The file system management program 6 recognizes that this demand is a file path specification, which is object-file-relative, because it includes a specification "!". Therefore the file system management program 6 refers to the file system management table 7 so as to obtain the object directory information from the entry corresponding to the object program 2a and transforms "!/../lib/trans" into "/obj/. /lib/trans". Since "/obj/../lib/trans" is equal to "/lib/trans", the file system management program 6 executes the object program "/lib/trans" and at the same time prepares an entry of the object program Y corresponding to the object program 2b having "/lib" as the object directory information.

For a file access and execution demand from the object programs 2a and 2b by using a path name including no "!" the file system management program 6 interpretes the file name as it is and realizes the access and the execution.

Although a symbol "!" was used in the above embodiments in order to express an object file relative situation, whichever any symbol can be used therefor, if it can express that it is an object file relative without any contradiction to others. Further a new system call may be disposed for the file system management and by making a mode consisting of the usual absolute path interpretation and the object file relative path interpretation, another method may be adopted, by which the interpretation is determined differently for the same file path specification, depending on the mode at that time.

Furthermore, although the object directory information was used as information for transforming an object file relative path into an absolute path, any information may be used, if it is information which can transformed into object directory information, e.g. the absolute path of the object file itself is stored, etc.

According to the above embodiments, since an object file relative file specification can be effected only by changing the file name, an effect that modification of an already existing program to another using the object file relative can be easily done is obtained.

Figure 4A:
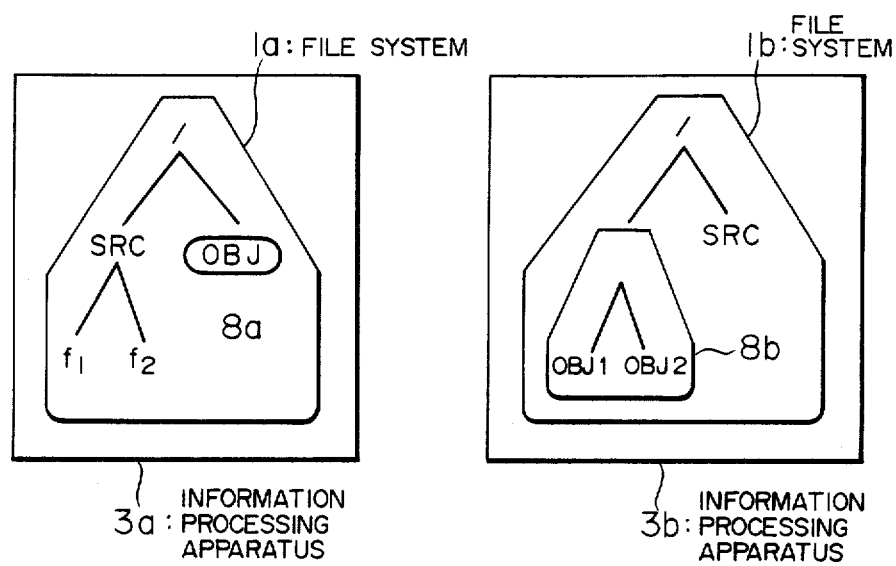
FIGS. 4A and 4B are conceptional schemes for explaining the effect of the file management system according to this invention.
Figure 4B:
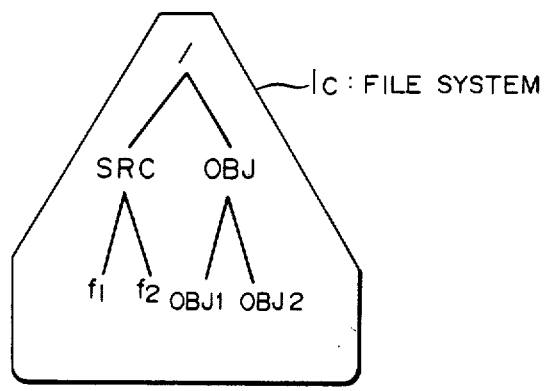

This invention has a remarkable effect also in the case where a plurality of information processing systems access a subtree of the file system in an information processing system in common through a network, as indicated in FIGS. 4A and 4B. This utilization in common is realized by coupling a subtree 8b of the file system 1b in an information processing system 3b with a subtree 8a of the file system 1a in another information processing device 3a so that the file system in the other information processing device stated above seems virtually to be 1c in FIG. 4B. Consequently the absolute path on the virtual file system obtained by coupling the file in the subtree 8b used in common varies largely depending on the position of the coupling. In the case where a program using the file specification by the absolute path was used in common, even if there were no restrictions in the coupling function itself, as described above, there was a problem that the subtree can be coupled only at a fixed position on the file system. On the contrary, by the program using the object file relative file path specification according to this invention, it is possible to couple a subtree at an arbitrary position and to use it in common.

We claim:

1. A file management method implemented by a computer for executing one program of a plurality of object programs in response to an executing-command instructing to execute said one program from another program, said executing-command including a relative-path being expressed in said another program by using a unified directory symbol and a file name of an object file having said one program being executed as a sub-routine program of said another program, said file management method comprising:

a first step of extracting directory information from a first executing-command inputted by a user, said first executing-command specifying an absolute-path including a first file name of a first object file having a first object program which said user demands to execute and directory information including a second file name of a directory file specifying said first object file, said first object file and said directory file specifying said first object file constituting a set of tree structured files;

a second step of storing said directory information extracted in said first step and corresponding to said first file name in memory;

a third step of judging, in response to a second executing-command instructing to execute a second object program from said first object program, whether or not said second executing-command includes said relative-path expressed by using said unified directory symbol and a third file name of a second object file having said second object program by detecting said unified directory symbol in said second executing-command;

a fourth step of exchanging said relative-path included in said second executing-command into an absolute-path for specifying said second object file if it was judged that said second executing-command included said relative-path in said third step, by replacing said unified directory symbol with said stored directory information corresponding to said first object file in said memory; and a fifth step of executing said second object program as a sub-routine program of said first object program by using said absolute-path exchanged in said fourth step.

2. A file management method according to claim 5, wherein, in said third step, if said second executing-command does not include said unified directory symbol, executing said second object program by using an absolute-path included in said second executing-command without carrying out said fourth and fifth steps.

3. A file management apparatus for executing a first program of a plurality of object programs in response to an executing-command instructing to execute said one program from another program, said executing-command indicating a relative-path being expressed in said another program by using a unified directory symbol and a file name of an object file having said one program being executed as a sub-routine program of said another program, said file management apparatus comprising:

a memory for storing a plurality of object files each having an object program and a plurality of directory files each specifying at least one object file of said object files; and a processing unit for executing an object program in response to an executing-command including directory information instructing to execute said object program from another object program or a user, said processing unit including:

means for extracting directory information from a first executing-command inputted by a user, said first executing-command having an absolute-path including a first file name of a first object file having a first object program which said user demands to execute and directory information including a second file name of a directory file specifying said first object file;

means for storing said directory information extracted by said extracting means, corresponding to said first file name in said memory;

means for judging, in response to a second executing-command instructing to execute a second object program from said first object program, whether or not said second executing-command includes said relative-path expressed by using said unified directory symbol and a third file name of a second object file having said second object program, by detecting said unified directory symbol in said second executing-command;

means for exchanging said relative-path included in said second executing-command into an absolute-path for specifying said second object file if it was judged that said second executing-command included said relative-path by said judging means, by replacing said unified directory symbol with said stored directory information corresponding to said first object file in said memory; and means for executing said second object program as a sub-routine program of said first object program by using said absolute path exchanged by said exchanging means.

4. A file management apparatus according to claim 3, wherein said executing means executes said second object program by using an absolute-path included in said second executing-command if said judging means has judged that said second executing-command does not include said unified directory symbol.

* * * * *